Feb. 22, 1938. C. C. FARMER ET AL 2,108,788
ELECTROPNEUMATIC BRAKE
Filed Oct. 23, 1936
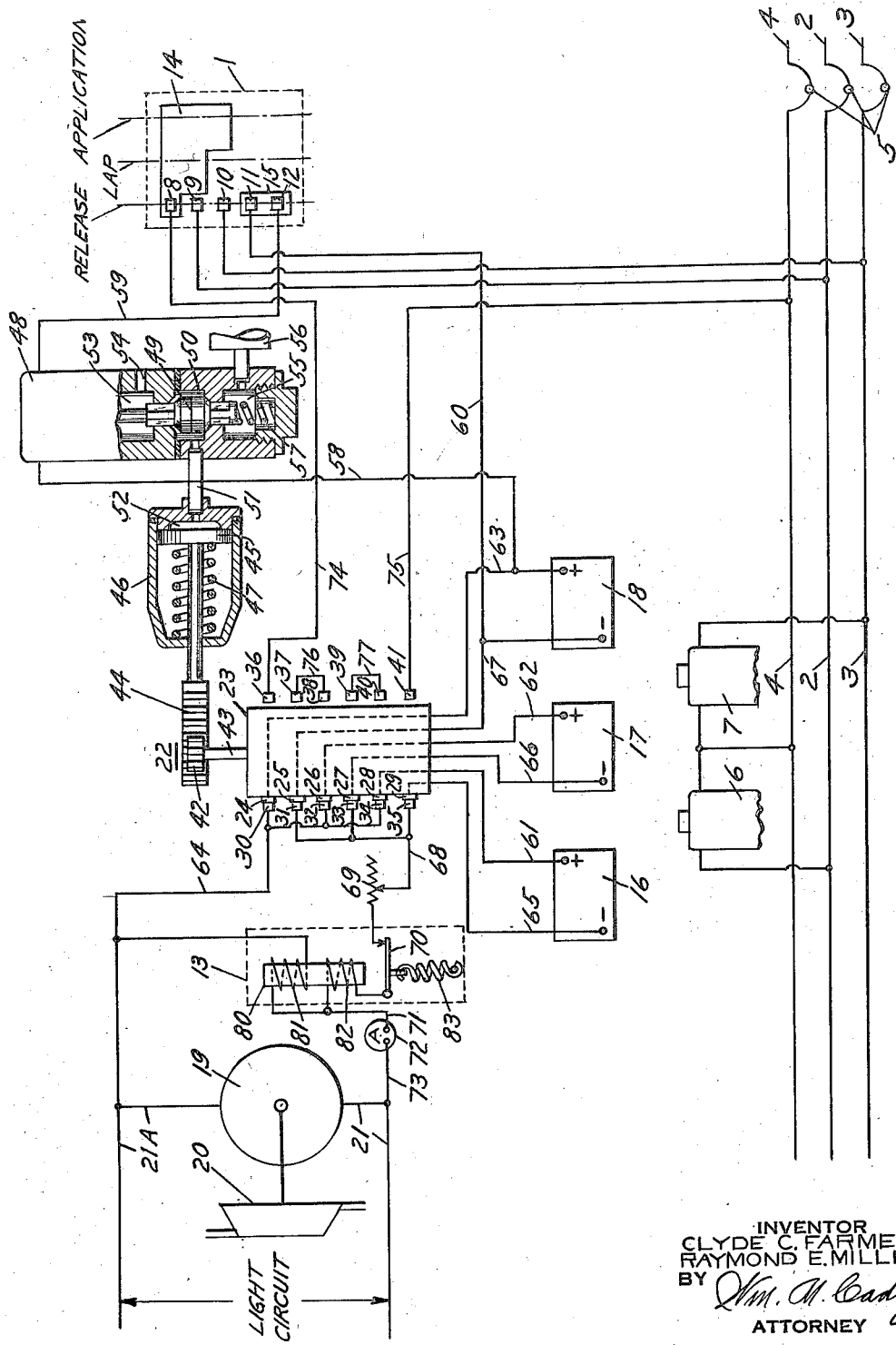
INVENTOR
CLYDE C. FARMER
RAYMOND E. MILLER
BY
Wm. M. Cady
ATTORNEY Patented Feb. 22, 1938

2,108,788

UNITED STATES PATENT OFFICE 2,108,788

ELECTRO-PNEUMATIC BRAKE

Clyde C. Farmer, Pittsburgh, and Raymond E. Miller, Wilkinsburg, Pa., assignors to Westinghouse Air Brake Company, Wilmerding, Pa., a corporation of Pennsylvania Application October 23, 1936, Serial No. 107,194

13 Claims. (Cl. 303—20)

This invention relates to electro-pneumatic brake equipment and more particularly to means for controlling the supply of electrical energy for controlling the operation thereof.

In electro-pneumatic brake systems, electro-responsive devices are provided on each car in a train for controlling the operation of the brakes on that car. These electro-responsive devices are connected to train wires which extend through the train, and at the locomotive a manually operated brake controller or switch is provided which is adapted to be operated by the engineer for controlling the operation of the electro-responsive devices throughout the train to control the application and release of the train brakes as desired.

While electric current for controlling the operation of the electro-responsive devices on the cars in the train may be obtained in any suitable manner, since locomotives are generally provided with steam driven generators adapted to provide current for lights and the like, it is preferable to employ current produced by such generators for controlling the electro-responsive brake devices on the train rather than to provide additional or different generators for producing such current.

The electric generators usually provided on locomotives are designed to produce 32 volt direct current, which, due to voltage drop through train wires, is inadequate to operate the electro-responsive devices at the rear of long trains. It has been determined, that around 96 to 100 volts is required at the head end of the train for providing sufficient current to operate the electro-responsive devices at the rear end of a long train; such for instance as a train of 150 cars.

The principal object of the invention is therefore to provide means whereby the usual 32 volt direct current generators on locomotives may be employed for use in providing adequate current for controlling the electro-pneumatic brakes on long trains.

This object is attained by providing a plurality of storage batteries each having a terminal voltage substantially equal to that of the usual generators provided on locomotives, and the batteries being sufficient in number, that the sum of their terminal voltages will provide that required for controlling the electro-responsive brake controlling devices on a long train, and in further providing means controlled by the engineer's brake switch whereby, when electric current is not being used for controlling the train brakes, the plurality of storage batteries are automatically connected in parallel across the terminals of the locomotive generator so as to become charged, and whereby when the engineer's brake switch is moved to a position in which current from the batteries is required for effecting an application of the train brakes or the like, the plurality of storage batteries are automatically connected in series to provide the required voltage for control of the brakes on the train.

Other objects and advantages will be apparent from the following more detailed description of the invention.

In the accompanying drawing, the single figure is a diagrammatic view of a portion of an electro-pneumatic brake equipment employed on a locomotive and with which the invention is associated.

As shown in the drawing, the invention is associated with an electro-pneumatic brake equipment of the type comprising a manually operated engineer's brake switch device 1 provided for controlling brake circuits in a release train wire 2, an application train wire 3 and a return or ground wire 4, these wires being adapted to extend through a train and to be connected between the cars in a train by connectors 5.

The locomotive and the cars in a train may each be provided with a brake controlling valve device including an electro-responsive device or release magnet 6 connected across train wires 2 and 4, and an electro-responsive device or application magnet 7 connected across train wires 3 and 4. These magnets are adapted to cooperate to control the brakes on a train, being operative when both are deenergized to effect a release of the brakes, when both are energized to effect an application of the brakes, and when the magnet 6 is energized and the magnet 7 deenergized to lap the brakes. The particular construction of these devices and the particular manner in which the brakes on the locomotive and cars in a train are controlled thereby is not pertinent to the invention and a further description thereof is therefore deemed unnecessary.

The brake switch device 1 comprises a plurality of fixed contacts 8 to 12 and two movable contacts 14 and 15 adapted to cooperate with said fixed contacts in the various positions of the brake switch device for controlling circuits including the train wires 2, 3 and 4, as will be hereinafter more fully described.

Three storage batteries 16, 17 and 18, which may be 32 volt batteries, are employed for providing current for operating the electro-responsive devices 6 and 7 throughout the train and means are provided for either connecting these batteries across an electric generator 19 for charging the batteries or for connecting the batteries to the brake switch 1 for the control of train brakes.

The generator 19 is the usual 32 volt type employed on locomotives for providing current for a lighting circuit which includes wires 21, 21A, and is adapted to be driven by a turbine 20 which is adapted to be operated by steam obtained from the usual locomotive boiler (not shown).

A change-over switch device 22 is provided for either connecting the batteries 16, 17 and 18 in parallel across the generator 19 for charging the batteries, or in series to the brake switch device 1 for controlling the brakes on the train according to the operation of the brake switch.

The change-over switch device 22 comprises a drum 23 adapted to be turned to either one or the other of two positions and is provided with a plurality of contacts 24 and 29 adapted in one of said positions to engage a like number of fixed contacts 30 to 35 and in the other of said positions to engage a like number of fixed contacts 36 to 41, respectively.

A gear 42 is mounted on a shaft 43 which is connected to the switch drum 22 and engages a rack 44 which is connected to a piston 45 contained in a cylinder 46. A spring 47 is provided in the cylinder 46 and acts on the piston 45 for urging same and the switch drum 22 to their normal or battery charging position, as shown in the drawing.

A magnet valve device is provided for controlling the operation of the piston 45 and comprises a magnet 48 and a double beat valve 49 controlled by said magnet. The valve 49 is contained in a chamber 50 which is connected to a pipe 51 communicating with a chamber 52 at the right hand face of piston 45 and is adapted to control communication between said chamber and a chamber 53 which is open to the atmosphere through a passage 54 and another chamber 55 which is connected to any suitable source of fluid under pressure such as may be provided in a reservoir 56. A spring 57 is provided in chamber 55 and acts on the valve 49 urging said valve in an upwardly direction.

One terminal of the magnet 48 is connected by a wire 58 to the positive terminal of battery 18 while the other terminal of said magnet is connected by wire 59 to fixed contact 12 in the brake switch device 1. Fixed contact 11 in the brake switch device 1 is connected by wire 60 to the negative terminal of battery 18. With the brake switch device 1 in the normal or release position, as shown in the drawing, the movable contact 15 bridges the contacts 11 and 12 thereby closing a circuit through magnet 48 energizing same, so that the valve 49 is moved to its lower position against the opposing pressure of spring 57. In this position of valve 49, the piston chamber 52 is vented to the atmosphere through chambers 50, 53 and passage 54 and this permits the spring 47 to position the piston 45 and thereby the change-over switch drum 23 in the positions shown in the drawing.

In this position of the change-over switch 22, the positive terminals of the batteries 16, 17 and 18 are connected to the light wire 21A and thereby to one side of the generator 19 through respectively, wires 61, 62, and 63, contacts 28, 26, 24 on the switch drum 23, fixed contacts 34, 32, and 30 which are all connected to a common wire 64 which in turn is connected to wire 21A. The negative terminals of the batteries 16, 17 and 18 are connected to the light wire 21 and thus to the opposite side of the generator 19 through, respectively, wires 65, 66, and 67, movable contacts 29, 27, and 25, fixed contacts 35, 33 and 31 which engage said movable contacts and which are connected to a common wire 68, and from thence through a charging regulator device 69, a cut out device 13, wire 71, ammeter 72 and wire 73 to wire 21.

So long as the brake switch device 1 is in the release position the batteries 16, 17 and 18 will be connected in parallel across the terminals of the generator 19 and thus on charge as above described. The rate of charge as indicated by ammeter 72 and which is adjustable by the regulator 69, may be relatively low so as to avoid appreciable loading of the generator 19, since the brake switch device 1 is carried in the release position for from 95 to 98 percent of the time a train is running, and current is drawn from the batteries only during the remaining 2 to 5 percent of the time when the brake switch device is in some position other than release position, as will be hereinafter described.

The cut out device 13 is provided for preventing discharge of the batteries 16, 17 and 18 or short circuiting thereof through the generator 19 in case the speed of said generator becomes reduced to a degree where the terminal voltage thereof is less than that of the batteries.

For this purpose the cut out device 13 may comprise an iron core 80 upon which there is provided a shunt winding 81 connected across the terminals of the generator 19 and a series winding 82 adapted to be connected in series with the generator 19 and batteries 16, 17 and 18 and to carry the charging current for said batteries. In operation, when the speed of the generator 19 exceeds a predetermined degree, sufficient current passes through the shunt winding 81 to energize the core 80 and pull the armature 70 toward the core 80 against the resistance of a spring 83 and thus close the battery charging circuit from wire 71 through the series winding 82 and armature 70 to the regulator 69.

If the generator voltage should become reduced to below that in the batteries due to stopping or slowing down of the generator, then the batteries act to discharge through the series coil 82 which neutralizes the effect of the shunt coil 81 and permits spring 83 to open the armature contact 70.

When it is desired to effect an application of the brakes, the brake switch device 1 is moved from release position to application position so that the contact 15 is moved out of engagement with contacts 11 and 12. The circuit is thereby opened through magnet 48 which becomes deenergized. Spring 57 then shifts the double beat valve 49 to its upper seated position whereupon fluid under pressure flows from reservoirs 56 through chambers 55 and 50 and pipe 51 to piston chamber 52. The piston 45 is thereby moved towards the left hand against the pressure of spring 47.

This movement of piston 45 acts through the rack 44 and gear 42 to turn the shaft 43 and thereby the switch drum 23 from the position shown in the drawing to that in which the movable contacts 24 to 29 engage the fixed contacts 36 to 41, respectively.

In this position of the change-over switch device, the batteries 16, 17 and 18 are disconnected from the generator 19. The positive terminal of battery 18 is connected to the fixed contact 8 in the brake switch device 1 through wire 63 contacts 24 and 36 and wire 74, the negative terminal of battery 16 is connected to the train return wire 4 through wire 65, contacts 29 and 41 and wire 75, and the three batteries are connected in series as follows, the negative terminal of battery 18 being connected to the positive terminal of battery 17 through wire 67, contacts 25 and 37, wire 76 contacts 38 and 26 and wire 62, while the negative terminal of battery 17 is connected to the positive terminal of battery 16 through wire 66, contacts 27 and 39, wire 77, contacts 40 and 28 and wire 61. Thus the terminal voltages of the batteries 16, 17 and 18 are added and impressed at one side on the brake switch contact 8 and at the other side on return wire 4.

With the brake switch device 1 in application position, the movable contact 14 bridges the contacts 8, 9 and 10 which permits current supplied to contact 8 to be supplied to contacts 9 and 10 and from thence to the release train wire 2 and application train wire 3. Since the electro-responsive devices 6 and 7 in the train are connected across the wires 2 and 4, and 3 and 4, respectively, said devices are thereby energized and act to effect an application of the brakes.

In lap position of the brake switch device 1 the movable contact 14 bridges only the contacts 8 and 9 so that only the electro-responsive device 6 on the cars in a train will be energized. This holds the brakes applied and prevents the brakes from being released, while the electro-responsive device 7 being deenergized in this position of the brake switch device 1 prevents an increase in the degree of application.

If it is desired to effect a release of the brakes, the brake switch device 1 is returned to the release position in which the movable contact 14 is moved out of engagement with the fixed contacts 9 and 8. The supply of electric current from the batteries 16, 17 and 18 to the train wires 2 and 3 is thus cut off and as a consequence, the electro-responsive devices 6 and 7 are deenergized to effect a release of the brakes.

When the brake switch 1 is turned to release position, the movable contact 15 bridges contacts 11 and 12 and thus places the magnet 48 in circuit with battery 18 as hereinbefore described. The magnet 48 is thereby energized and operates the double beat valve 49 to vent fluid under pressure from the piston chamber 52 to the atmosphere through pipe 51, chambers 50 and 53 and passage 54. Spring 47 then shifts the piston 45 to its right hand position, as shown in the drawing.

This movement of piston 45 by spring 47 acts through the rack 44 and gear 42 to turn the movable contacts 24 to 29 out of engagement with the fixed contacts 36 to 41 and to the position shown in the drawing in which the batteries 16, 17 and 18 are again connected in parallel across the generator 19 and thereby placed on charge, as hereinbefore described.

It will now be evident that by the use of my improvement, storage batteries adapted to be charged from the usual relatively low voltage generator employed on locomotive, may be employed for providing the relatively high voltage required for controlling the electro-pneumatic brakes on a train. According to my improvement the storage batteries have a terminal voltage substantially equal to that of the usual locomotive generator so that said generator may be employed for charging the batteries, and the batteries are sufficient in number that the added terminal voltage of the batteries provides the required voltage for the control of the train brakes, and means are provided, controlled by the engineer's brake switch device, whereby the batteries are automatically connected in parallel across the generator so as to be charged, whenever energy is not being used from the batteries for controlling the brakes, and whereby when the brake switch device is operated to draw energy from the batteries for controlling the brakes, the batteries are automatically connected in series to provide the required voltage for brake control.

While one illustrative embodiment of our invention has been described in detail, it is not our intention to limit its scope to this embodiment or otherwise than by the terms of the appended claims.

Having now described our invention, what we claim as new and desire to secure by Letters Patent, is:

1. In combination with a brake control mechanism, electrically controlled means for controlling the application and the release of the brakes, a manually operative switch device for controlling the operation of said means, an electric generator, a plurality of storage batteries, switch means having one position for connecting said batteries in parallel with said generator, and another position for connecting said batteries in series, and means controlled by said switch device for operating said switch means.

2. In combination with a brake control mechanism, electrically controlled means for controlling the application and the release of the brakes, a manually operative switch device for controlling the operation of said means, an electric generator, a plurality of storage batteries, switch means having one position for connecting said batteries in parallel with said generator, and another position for connecting said batteries in series, means controlled by said switch device for operating said switch means, and means operative by said switch device for supplying current from said batteries to said electrically controlled means when the batteries are connected in series.

3. In combination with a brake control mechanism, electrically controlled means for controlling the application and the release of the brakes, a manually operative switch device for controlling the operation of said means and having an application and a release position, an electric generator, a plurality of storage batteries, switch means having one position for connecting said batteries in parallel with said generator and another position in which said batteries are connected in series, means controlled by said switch device for operating said switch means and operable in the release position of said switch device to connect said batteries in parallel with said generator and in application position to connect said batteries in series, said switch device being adapted in application position to supply current from said batteries to said electrically controlled means.

4. In combination, electrically controlled means for controlling the application and the release of brakes, a manually operative switch device for controlling said means and having an application and a release position, an electric generator, a plurality of storage batteries, means controlled by said switch device and operative in one position thereof to connect said batteries in parallel with said generator for charging said batteries from said generator and operative in the other position to connect said batteries in series to said switch device.

5. In combination, electrically controlled means for controlling the application and the release of brakes, a manually operative switch device for controlling said means and having an application and a release position, an electric generator, a plurality of storage batteries, means controlled by said switch device and operative in one position thereof to connect said batteries in parallel with said generator for charging said batteries from said generator and operative in the other position to connect said batteries in series to said switch device, and means in the charging circuit of said batteries for regulating the amount of current supplied from said generator to said batteries.

6. In combination, electrically controlled means for controlling the application and the release of brakes, a manually operative switch device for controlling said means and having an application and a release position, an electric generator, a plurality of storage batteries, means controlled by said switch device and operative in one position thereof to connect said batteries in parallel with said generator for charging said batteries from said generator and operative in the other position to connect said batteries in series to said switch device and means controlled by the terminal voltage of said generator and batteries for controlling the charging circuit of said batteries and operative to open said circuit if the terminal voltage of the generator reduces below that of said batteries.

7. In combination, electrically controlled means for controlling the application and the release of brakes, a manually operative switch device for controlling said means and having an application and a release position, an electric generator, a plurality of storage batteries, a change-over switch having one position for connecting said batteries in parallel with said generator and another position for connecting said batteries in series with said switch device, and means operative in release position of said switch device for effecting movement of said change-over switch to the position for connecting said batteries in parallel with said generator, and operative in application position for effecting movement of said change-over switch to its other position.

8. In combination, a manually operated brake control switch having a plurality of positions for controlling the brakes on a train, an electric generator, a plurality of storage batteries, a switch device having one position for connecting said batteries in parallel with said generator for charging said batteries and having another position for connecting said batteries in series to said brake control switch, and means controlled by said brake control switch and operative in one position thereof for operating said switch device to connect said batteries to said generator and in all other positions of said brake control switch to operate said switch device to connect said batteries to said brake control switch.

9. In combination, a manually operated brake control switch having a plurality of positions for controlling the brakes on a train, an electric generator, a plurality of storage batteries, a switch device having one position for connecting said batteries in parallel with said generator for charging said batteries and having another position for connecting said batteries in series to said brake control switch, a piston operative by fluid under pressure to move said switch device to one of its positions, a spring operative upon the relief of fluid under pressure on said piston to move said switch device to its other position, valve means for controlling the supply and release of fluid under pressure to and from said piston, and a magnet for controlling said valve means, said brake control switch being operative in one of said positions to effect energization of said magnet and in another of said positions to effect deenergization of said magnet.

10. In combination, an electric generator having a relatively low terminal voltage, electro-responsive means operative to control the brakes on a train and requiring a relatively high voltage for operation thereof, a plurality of storage batteries each having a terminal voltage substantially equal to that of said generator, the batteries being sufficient in number that the sum of the terminal voltages thereof equals substantially the relatively high voltage required for effecting the operation of said electro-responsive means, a manually operated brake control switch having a plurality of brake controlling positions including a release position, and means controlled by said brake control switch and operative in the release position thereof to connect said batteries in parallel with said generator for charging said batteries and operative in all other positions of said brake control switch to disconnect said batteries from said generator and to connect said batteries in series with said brake control switch, said brake control switch being operative in said other positions to supply current, supplied thereto from said batteries by the operation of said means, to said electro-responsive means for controlling the brakes on the train.

11. In combination, an electric generator, a plurality of storage batteries each having a terminal voltage substantially equal to that of said generator, a plurality of train wires including a ground or return wire through the medium of which the brakes on a train are adapted to be controlled, a manually operated brake switch having a plurality of brake controlling positions, including a release position, a change-over switch device controlled by said brake switch and operative in the release position thereof to connect said batteries in parallel with said generator and operative in all other positions of said brake switch to disconnect said batteries from said generator and to connect said batteries in series with one terminal connected to said brake switch and the other connected to said return wire, said brake switch being operative in said other positions to control connections between the battery terminal connected thereto and said train wires, other than said return wire.

12. In combination, an electric generator, a plurality of storage batteries each having a terminal voltage substantially equal to that of said generator, a plurality of train wires through the medium of which the brakes on a train are adapted to be controlled, a manually operated brake switch having a plurality of brake controlling positions, including a release position, a change-over switch device controlled by said brake switch and operative in the release position thereof to connect said batteries in parallel with said generator and operative in all other positions of said brake switch to disconnect said batteries from said generator and to connect said batteries in series with said brake switch, said brake switch being operative in said other positions to control the supply of current from the serially connected batteries to said train wires.

13. In combination, an electric generator, a plurality of storage batteries each having a terminal voltage substantially equal to that of said generator and adapted to be charged by said generator, a plurality of train wires through the medium of which the brakes on a train are adapted to be controlled, a brake switch having a plurality of brake control positions for controlling connections between said batteries and train wires, means having one position for connecting said batteries in parallel with said generator and another position for connecting said batteries in series with said brake control switch whereby operation of said brake control switch may supply electrical energy to said train wires, electro-responsive means operative upon energization to effect movement of said means to the position for connecting said batteries with said generator for charging and operative upon deenergization to effect movement of said means to the position for connecting said batteries in series with said brake switch, the plurality of positions of said brake control switch including a release position for connecting said electro-responsive means in circuit with one of said batteries for effecting energization thereof, said brake switch being operative in all positions except release positions to break the circuit through said electro-responsive means for effecting deenergization thereof.

CLYDE C. FARMER.
RAYMOND E. MILLER.